United States Patent
Giersch et al.

[11] Patent Number: 6,035,722
[45] Date of Patent: Mar. 14, 2000

[54] PRESSURE SENSOR FOR DETECTING THE PRESSURE IN A PUMP WORK CHAMBER OF A FUEL INJECTION PUMP

[75] Inventors: Rolf-Juergen Giersch, Eberdingen; Michael Scharf, Wolfenbuettel; Joerg-Peter Fischer, Deizisau, all of Germany

[73] Assignee: Robert Bosch GmbH, Stuttgart, Germany

[21] Appl. No.: 09/177,599

[22] Filed: Oct. 23, 1998

[30] Foreign Application Priority Data

Nov. 4, 1997 [DE] Germany .............................. 197 48 578

[51] Int. Cl.[7] .............................. G01L 7/00; G01M 15/00
[52] U.S. Cl. ............................................. 73/714; 73/119 A
[58] Field of Search ................................... 73/119 A, 714, 73/754, 756; 123/447, 496, 506

[56] References Cited

U.S. PATENT DOCUMENTS

| | | | |
|---|---|---|---|
| 4,497,201 | 2/1985 | Allen et al. | 73/119 A |
| 4,587,840 | 5/1986 | Dobler et al. | 73/119 A |
| 4,940,037 | 7/1990 | Eckert | 123/506 |

FOREIGN PATENT DOCUMENTS

| | | |
|---|---|---|
| 0 400 060 B1 | 10/1992 | European Pat. Off. . |
| 43 03 011 A1 | 8/1994 | Germany . |

*Primary Examiner*—William Oen
*Attorney, Agent, or Firm*—Edwin E. Greigg; Ronald E. Greigg

[57] ABSTRACT

A pressure sensor for detecting the pressure of a medium bounded by a wall, in particular for detecting the pressure in the pump work chamber of a fuel injection pump, with a housing that is disposed in a through bore of the central screw plug of the fuel injection pump. The housing has a separate front housing part, which is welded to a measuring element support and together with this measuring element support, a measuring element, a pressure transmission element, and a membrane that constitutes the bottom of the front housing part, constitutes a measurement head that is definitely braced in the pressure transmission direction and cannot be disassembled. The measurement head contacts the through bore and other components of the pressure sensor exclusively by way of an outer flange, which is disposed on the outer circumference of the measurement head.

20 Claims, 1 Drawing Sheet

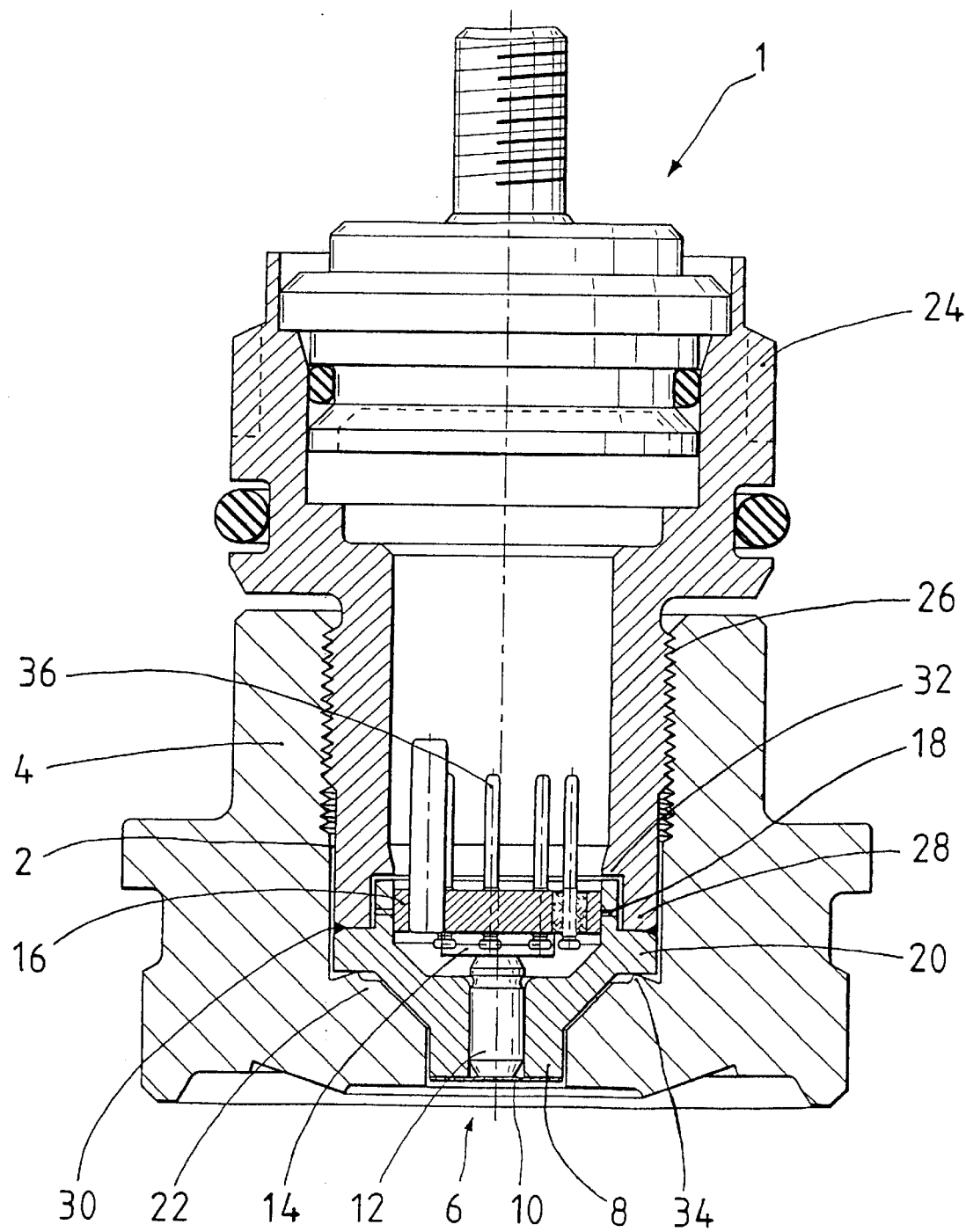

6,035,722

PRESSURE SENSOR FOR DETECTING THE PRESSURE IN A PUMP WORK CHAMBER OF A FUEL INJECTION PUMP

BACKGROUND OF THE INVENTION

The invention is based on a pressure sensor. In a pressure sensor of this kind, which has been disclosed for example by DE-A-43 03 011, the bottom of the sensor housing is embodied as a pressure transmission element. The sensor housing has an internal thread into which a plunger is screwed, which presses the measuring element for the pressure transmission against the bottom with an initial stress. The magnitude of this initial stress is decisive for the function of the pressure sensor and is set ahead of time. With an excessive or insufficient initial stress of the measuring element, there is the danger that the measurement curve is not linear. Furthermore, an excessive or insufficient stress has a negative impact on the fatigue strength of the measuring element and the bottom. If the screw mounted plunger rotates intentionally or unintentionally out of its defined adjustment position, the initial stress also changes, which acts on the measuring element and the bottom. Furthermore, under the high pressures in the injection system, settling processes take place in the threads, by means of which the initial stress tapers off over time.

Finally, European Patent EP 0 400 060 has disclosed a measuring device for detecting a pressure, in which the initial stress on the measuring element is likewise generated by means of detachable, positive fit connections. As with the screw connection, settling processes also occur over time at mold seams of these connections and reduce the initial stress on the measuring element.

OBJECT AND SUMMARY OF THE INVENTION

The pressure sensor according to the invention has the advantage over the prior art that by means of the welding of the measuring element support to the housing, changes in the initial stress are prevented once it is set. As a result, it is assured on the one hand that the measuring element always functions in the linear region. On the other hand, by maintaining an initial stress that is optimal for the fatigue strength, the service life of the pressure sensor is increased. Since the measurement head is supported in the through bore of the wall solely by way of its outer flange, the force flow of the clamping forces travels mainly by way of the outer flange, by means of which the initial stress forces acting on the membrane and on the measuring element do not overlap any additional clamping forces so that by means of this, a change of the initial stress can also be deliberately prevented. In addition, the measurement head represents a separate subassembly, which can be manufactured in a reasonably priced manner as a preassembled unit.

The invention will be better understood and further objects and advantages thereof will become more apparent from the ensuing detailed description of preferred embodiments taken in conjunction with the drawing.

BRIEF DESCRIPTION OF THE DRAWING

The sole FIGURE shows a longitudinal section through a preferred exemplary embodiment according to the invention.

DESCRIPTION OF THE PREFERRED EMBODIMENTS

The preferred exemplary embodiment of a pressure sensor 1 according to the invention shown in FIG. 1 is mounted in a through bore 2 of a central screw plug 4 of a known distributor injection pump, which is not shown. The side of the pressure sensor 1 oriented toward the pressure medium has a measurement head 6, which is disposed in a separate front housing part 8 of the pressure sensor 1 and viewed in the pressure transmission direction, has a membrane 10, a thrust bolt 12, a measuring element 14, and a measuring element support 16. The measuring element support is preferably a cylindrical metal plate 16, whose radial outer circumference face is welded to the radial inner circumference face of the front housing part 8 in such a way that the measuring element 14, which is disposed on the side of the measuring element support 16 oriented toward the thrust bolt 12, exerts a definite initial stress force on the membrane 10 by way of the thrust bolt 12, by means of which the membrane 10 is deflected by approx. 5 µm toward the pressure medium. The order of magnitude of the membrane deflection results in the fact that even extremely small geometrical changes in the measurement head 6 can significantly alter the preset initial stress, especially since the membrane 10 is embodied as relatively stiff due to the high steady load.

The membrane 10 is preferably welded to the front housing part 8, wherein the wall thickness of the membrane 10 is small in relation to the wall thickness of front housing part 8. The front housing part 8 is thin-walled in the region of the welded connection to the measuring element support 16 so that the two parts can be connected to each other by means of a laser weld 18. As a result of the welds, the measurement head 6 constitutes a unit that cannot be disassembled so that the initial stress on the membrane 10 cannot be altered either intentionally or unintentionally.

An outer flange 20 is disposed on the outer circumference of the front housing part 8 and, in order to support the is measurement head 6 in the through bore 2, is axially clamped between a shoulder 22 that reduces the diameter of the through bore 2 and a rear housing part 24 screwed into the through bore 2. To that end, in a rear region, viewed in terms of the pressure transmission direction, the rear housing part 24 has an external thread 26 that is screwed into an internal thread of the through bore 2 and maintains a relatively large axial spacing from the measurement head 6 disposed on the front end of the pressure sensor 1. This axial distance assures the fact that the clamping forces, which are transmitted along the external thread 26, do not act on the measurement head 6.

An end of the wall of the rear housing part 24 oriented toward the measurement head 6 is embodied as step-shaped in such a way that a longer stepped part 28 is braced against the outer flange 20 of the front housing part 8, and is connected to it on its radial outer circumference edge by means of a weld 30, wherein the rear housing part 24 and the front housing part 8 overlap one another in the radial direction with a radial spacing. The longer stepped part 28 encompasses the wall part of the front housing part projecting from the outer flange 20 to the rear housing part 24. A shorter stepped part 32 of the wall end of the rear housing part 24 is disposed opposite the end face of the front housing part 8, with an axial spacing. According to the preferred embodiment, the outer flange 20 is continuous, but it can also be comprised of one or more outer flange sections, which are disposed on the outer circumference of the front housing part 8, spaced circumferentially apart from one another.

The shoulder 22 of the through bore 2 has a continuous sealing edge 34 oriented in the pressure transmission direction, against which the outer flange 20 of the front housing part 8 is braced. Since the pressures that arise in the injection system are very high, the sealing edge 34 is comprised of metal and deforms elastically and/or plastically under the clamping force. As a result, the deformations occur due to the clamping forces on the sealing edge 34 and not on the outer flange 20 of the front housing part 8. The sealing edge 34 is preferably of one piece with the central screw plug 4, but separate sealing elements such as sealing disks or insert rings can also be used.

As can be seen in FIG. 1, the measurement head 6 contacts other components of the pressure sensor 1 and the through bore 2 exclusively by way of the surfaces of the outer flange 20 that point in the pressure transmission direction, by means of which the measurement head 6 is supported clamped in the through bore 2 of the central screw plug 4. In contrast, all the other outer surfaces of the measurement head 6 are spaced apart from adjoining surfaces of other components. By means of this, it is likewise assured that the measurement head 6 and in particular, the initial stress of the membrane 10, is not influenced by means of any clamping forces or bearing forces. Because the force flow of the clamping forces travels from the external thread 26 by way of the longer stepped part 28 of the rear housing part 24 and by way of the outer flange 20 into the shoulder 22 of the through bore 2 and as a result, around the prestressed membrane/thrust bolt/measuring element device. Since the shorter stepped part 32 of the rear housing part 24 is disposed opposite the end face of the front housing part 8 with axial spacing, no clamping forces can be transmitted by way of these surfaces either. The same is also the case for the radial circumference faces in the region of the overlapping of the rear housing part 24 with the front housing part 8 since these surfaces are disposed with radial spacing in relation to each other.

As can be seen from the previous embodiments, the housing of the pressure sensor is embodied as having two parts according to the preferred embodiment and is comprised of the front housing part 8 that comprises the measurement head 6 and the rear housing part 24 that fixes it. As a result, the choice of material and the dimensioning for the two housing parts 8, 24 can be separately adapted to the different requirements. Thus, the wall thickness of the rear housing part 24 is relatively great in relation to that of the front housing part 8 in order, on the one hand, to be able to exert a high screw-tightening moment on the rear housing part 24 and in order, on the other hand, to be able to through-weld the front housing part 8 from the outside to the measuring element support 16. In addition, the division of the housing into two parts permits the separate measurement head 6 to be embodied as arbitrarily short. As a result, the thrust bolt 12 is likewise short, with a correspondingly lower mass, which in terms of the high pressure accelerations to which it is subjected, leads to lower inertial forces and leads to a lower oscillation excitation of the measurement system. Moreover, a shorter thrust bolt 12 produces a more rigid transmission of pressure impacts from the membrane 10 to the measuring element 14.

Pressure sensors 1 of this kind can be used preferably in pressure measurement in distributor injection pumps of fuel injection systems as well as in combustion pressure measurement in diesel or Otto engines. When employed in distributor injection pumps, the current pressure in the pump work chamber is detected by means of the pressure sensor 1 and from this, the onset of supply and the end of supply of the pump are determined. From these parameters, the delivery duration and the delivery quantity can be calculated, which are used as input quantities for the regulation and control functions of the injection system.

The operation of the pressure sensor 1 is known to a sufficient degree and therefore is only explained briefly here. The detection of the pressure in the pump work chamber of the fuel injection pump is carried out by way of the axial deflection that is produced in the membrane 10 by the pressure of the pressure medium, and with the aid of the thrust bolt 12, this deflection is transmitted uniformly to the measuring element 14. The measuring element 14 contains a chip, in which on the one hand, the measurement principle and on the other hand, the evaluation of the measurement data are realized. According to the preferred embodiment, the measurement is carried out in a piezo-resistive manner, wherein with the impingement of pressure on the membrane 10, the resistance values change inside a full bridge circuit and the measurement signals are transmitted by way of measurement head pins 36 protruding from the measuring element support 16. Since the measurement head pins 36 are easily accessible from the outside by means of the rear opening of the rear housing part 24, the measurement head 6 can also be adjusted in the installed state.

The foregoing relates to preferred exemplary embodiments of the invention, it being understood that other variants and embodiments thereof are possible within the spirit and scope of the invention, the latter being defined by the appended claims.

We claim:

1. A pressure sensor (1) for detecting a pressure of a medium bounded by a wall, in particular for detecting the pressure in a pump work chamber of a fuel injection pump, a housing (8, 24) that is disposed in a through bore (2) of the wall and is closed off in relation to the medium, a pressure of the medium is determined, by means of a bottom (10) against which, on a side remote from the medium, a pressure transmission element (12) rests, said pressure transmission element which transmits the pressure from the medium acting on the bottom (10) to a measuring element (14) disposed in the housing (8), the housing includes a separate front housing part (8), which is connected to a measuring element support (16) by means of a first weld (18) and together with this measuring element support, the measuring element (14), the pressure transmission element (12), and a membrane (10) that constitutes the bottom of the front housing part (8), constitutes a measurement head (6) that is definitely braced in the pressure transmission direction and cannot be disassembled, and said measurement head (6) contacts the through bore (2) and other components of the pressure sensor (1) exclusively by way of an outer flange (20), which is disposed on an outer circumference of the measurement head (6).

2. The pressure sensor according to claim 1, in which the outer flange (20) is disposed on an outer circumference of the front housing part (8) and in order to support the measurement head (6) in the through bore (2), is clamped between a shoulder (22) that reduces the diameter of the through bore (2) and a rear housing part (24) that is screwed into the through bore (2) of the wall.

3. The pressure sensor according to claim 2, in which the rear housing part (24) has an external thread (26) that is screwed into an internal thread of the through bore (2) and is disposed spaced axially apart from the measurement head (6).

4. The pressure sensor according to claim 2, in which an end of the rear housing part (24) oriented toward the measurement head (6) is embodied as step-shaped in such a way that a longer stepped part (28) is braced against the outer flange (20) of the front housing part (8), and is connected to the outer flange (20) on its radial outer circumference edge by means of a second weld (30), wherein the rear housing part (24) and the front housing part (8) overlap one another in the radial direction with a radial spacing and a shorter stepped part (32) of the end of the rear housing part (24) oriented toward the measurement head (6) is disposed opposite the end face of the front housing part (8), spaced axially apart from it.

5. The pressure sensor according to claim 3, in which an end of the rear housing part (24) oriented toward the measurement head (6) is embodied as step-shaped in such a way that a longer stepped part (28) is braced against the outer flange (20) of the front housing part (8), and is connected to the outer flange (20) on its radial outer circumference edge by means of a second weld (30), wherein the rear housing part (24) and the front housing part (8) overlap one another in the radial direction with a radial spacing and a shorter stepped part (32) of the end of the rear housing part (24) oriented toward the measurement head (6) is disposed opposite the end face of the front housing part (8), spaced axially apart from it.

6. The pressure sensor according to claim 2, in which the shoulder (22) of the through bore (2) has a continuous sealing edge (34) against which the outer flange (20) of the front housing part (8) is braced.

7. The pressure sensor according to claim 3, in which the shoulder (22) of the through bore (2) has a continuous sealing edge (34) against which the outer flange (20) of the front housing part (8) is braced.

8. The pressure sensor according to claim 4, in which the shoulder (22) of the through bore (2) has a continuous sealing edge (34) against which the outer flange (20) of the front housing part (8) is braced.

9. The pressure sensor according to claim 5, in which the shoulder (22) of the through bore (2) has a continuous sealing edge (34) against which the outer flange (20) of the front housing part (8) is braced.

10. The pressure sensor according to claim 1, in which the measuring element support is constituted by means of a metal plate (16), whose outer circumference surface is connected to the inner circumference surface of the front housing part (8) by means of the first weld (18) and on whose side oriented toward the pressure transmission element (12) the measuring element (14) is disposed, which preferably functions in accordance with a piezo-resistive measurement principle.

11. The pressure sensor according to claim 2, in which the measuring element support is constituted by means of a metal plate (16), whose outer circumference surface is connected to the inner circumference surface of the front housing part (8) by means of the first weld (18) and on whose side oriented toward the pressure transmission element (12) the measuring element (14) is disposed, which preferably functions in accordance with a piezo-resistive measurement principle.

12. The pressure sensor according to claim 3, in which the measuring element support is constituted by means of a metal plate (16), whose outer circumference surface is connected to the inner circumference surface of the front housing part (8) by means of the first weld (18) and on whose side oriented toward the pressure transmission element (12) the measuring element (14) is disposed, which preferably functions in accordance with a piezo-resistive measurement principle.

13. The pressure sensor according to claim 4, in which the measuring element support is constituted by means of a metal plate (16), whose outer circumference surface is connected to the inner circumference surface of the front housing part (8) by means of the first weld (18) and on whose side oriented toward the pressure transmission element (12) the measuring element (14) is disposed, which preferably functions in accordance with a piezo-resistive measurement principle.

14. The pressure sensor according to claim 6, in which the measuring element support is constituted by means of a metal plate (16), whose outer circumference surface is connected to the inner circumference surface of the front housing part (8) by means of the first weld (18) and on whose side oriented toward the pressure transmission element (12) the measuring element (14) is disposed, which preferably functions in accordance with a piezo-resistive measurement principle.

15. The pressure sensor according to claim 1, in which in a region of the first weld (18) to the measuring element support (16), the front housing part (8) is thin-walled, and that the first weld (18) is produced by means of a laser weld.

16. The pressure sensor according to claim 2, in which in a region of the first weld (18) to the measuring element support (16), the front housing part (8) is thin-walled, and that the first weld (18) is produced by means of a laser weld.

17. The pressure sensor according to claim 3, in which in a region of the first weld (18) to the measuring element support (16), the front housing part (8) is thin-walled, and that the first weld (18) is produced by means of a laser weld.

18. The pressure sensor according to claim 1, in which the wall contains a central screw plug (4) of a fuel injection pump, which screw has a through bore (2).

19. The pressure sensor according to claim 1, in which the membrane (10) is welded to the front housing part (8) and the wall thickness of the membrane (10) is small in relation to the wall thickness of the front housing part (8).

20. The pressure sensor according to claim 2, in which the membrane (10) is welded to the front housing part (8) and the wall thickness of the membrane (10) is small in relation to the wall thickness of the front housing part (8).

* * * * *